Patented June 28, 1949

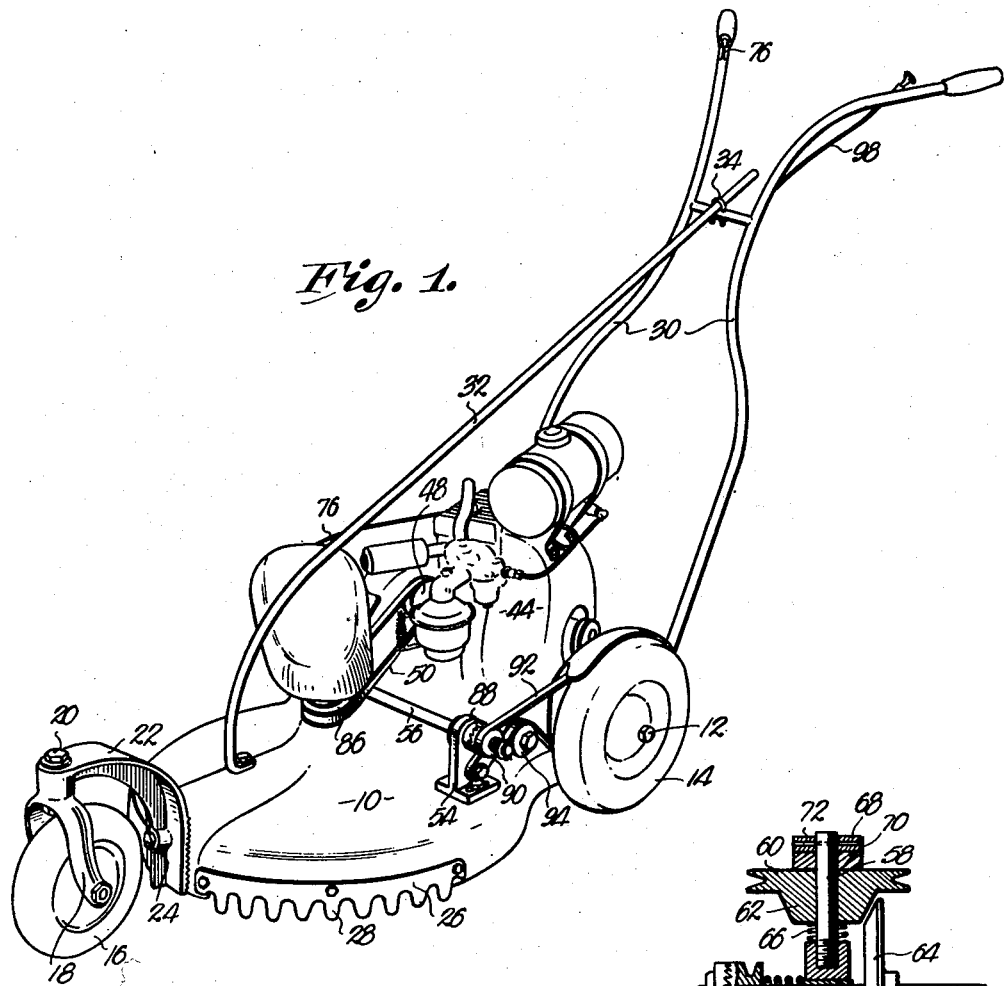

2,474,524

UNITED STATES PATENT OFFICE 2,474,524

POWER LAWN MOWER

Paul W. Hainke, Hutchinson, Kans., assignor, by mesne assignments, to William H. Hainke Application May 5, 1947, Serial No. 746,101

2 Claims. (Cl. 56—25.4)

This invention relates to lawn mowers of the kind having a platform and a cutting blade rotatable in a horizontal plane beneath said platform, the primary object being to provide apparatus of such character wherein the mower is motivated over the grass surface to be cut by connection with the aforesaid cutting mechanism.

The most important object of this invention is to provide a power mower having a platform carried by a wheel and axle assembly and having a cutting blade mounted upon an upright rotatable spindle, the wheels of said mower being driven by connection with the rotatable spindle.

Another important object of this invention is the provision of a power lawn mower having a vertical rotatable cutting blade spindle and a series of belts, pulleys and shafts interconnecting the spindle and certain of the supporting wheels to the end that the lawn mower is motivated through the same source of power as that used to drive the cutting blade.

A still further object of this invention is to provide a lawn mower having a pair of relatively shiftable bevel gears provided with manually manipulable structure for establishing interconnection therebetween and operably connecting the supporting wheels of the lawn mower with the cutting mechanism.

Other objects of this invention include the way in which an idler shaft is carried by the platform for mounting one of the bevel gears, the manner in which pulleys are affixed to each of the drive wheels for receiving belts joined to the idler shaft, the manner in which the other bevel gear is slidably mounted upon a stub shaft for movement into and out of engagement with the bevel gear on the idler shaft and the way in which a pair of complementary cam members mounted upon the stub shaft serve to shift the proximal bevel gears.

Many minor objects will appear during the course of the following specification, reference being had to the accompanying drawing wherein Figure 1 is a perspective view of the power lawn mower made in accordance with my present invention.

Fig. 2 is a perspective view thereof showing the same with the platform, wheels and prime mover entirely removed and;

Fig. 3 is a vertical substantially central sectional view through one of the bevel gears and the bearing supporting the same.

In the drawing the numeral 10 designates broadly a platform supported by a rear wheel and axle assembly consisting of an axle 12 and a pair of wheels 14, one only of which is illustrated. A single guide wheel 16 supports the normally forward end of platform 10 and this wheel 16 is rotatably mounted within a yoke 18 mounted for swiveling movement as at 20 in an arm 22. The arm 22 extends upwardly and forwardly from the forward end of the platform 10 and is provided with a plurality of teeth meshing with similar teeth formed on platform 10 as clearly illustrated in Fig. 1.

Platform 10 is provided with a vertical slot (not shown) for receiving a bolt or the like 24 which passes through the arm 22. Thus it is seen that platform 10 may be raised or lowered through the simple expedient of loosening bolt 24, sliding the same vertically within the aforesaid slot in platform 10 and retightening bolt 24 to clamp together the teeth of arm 22 and platform 10. Platform 10 is also provided with a guard plate 26 near the forward end thereof and on each side of the arm 22. These plates 26 are provided with a number of fingers 28 serving to pick up and guide the grass to be cut as the same is fed into the cutting mechanism of the mower.

A pair of handle bars 30 extend rearwardly and upwardly from the rear end of platform 10 and are pivotally secured to platform 10 in any suitable manner not shown. A rod 32 interconnects handle bars 30 with the platform 10 near the forward end of the latter and a clamp 34 is releasable to render the height of handle bars 30 adjustable.

A vertically disposed spindle 36 extends through the platform 10 substantially in the center thereof and is rotatably mounted within a housing or bearing not shown. A plurality of cutting blades 38 is carried by the spindle 36 at the lower-most end thereof and a pair of pulley wheels 40 and 42 are keyed or otherwise secured to spindle 36 at the opposite end thereof. These pulley wheels 40 and 42 are each disposed above the platform 10 as is a prime mover broadly designated by the numeral 44. The prime mover chosen for illustration is a conventional gasoline engine provided with a drive shaft 46 and a pulley 48 attached to shaft 46.

A belt or the like 50 interconnects the pulley wheels 48 and 42 on shaft 46 and spindle 36 respectively is twisted to drive the cutting blades 38 in the direction indicated by an arrow in Fig. 2.

A pair of spaced-apart bearings 52 and 54 are carried by a platform 10 upon the upper-most surface thereof which bearings 52 and 54 journal a horizontal idler shaft 56. This shaft 56 extends transversely across the platform 10 intermediate the ends thereof and is in substantial parallelism with the axle 12. The bearing 52 carries a vertical stub shaft 58 which extends upwardly from the upper-most end of bearing 52. A sheave wheel 60 having a bevel gear 62 integral therewith is slidably and rotatably mounted upon the stub shaft 58. A second bevel gear 64 is keyed to the idler shaft 56 between the bearings 52 and 54 and adjacent the gear portion 62 of sheave wheel 60. A spring 66 is coiled about the stub shaft 58 and interposed between bevel gear 62 and the upper-most end of the bearing 52.

A pair of complementary cam members 68 and 70 each having openings therethrough are mounted upon the stub shaft 58 near the upper-most end thereof, cam member 68 being secured to stub shaft 58 by a set screw or the like 72. The cam member 70 is freely rotatable upon stub shaft 58 and carries a laterally extending arm 74 which in turn has one end of a control cable 76 attached thereto near its outer-most end. This cable 76 extends upwardly through one of the handle bars 30 to a point outside of this one handle bar near the uppermost free end thereof as illustrated in Fig. 1.

The cam members 68 and 70 constitute a pair of washer-like members having complementary cam surfaces 78 and 80 respectively and a pair of abutting shoulders 82 and 84 respectively.

A belt 86 interconnects sheave wheel 60 and the pulley 40 on stub shaft 58 and spindle 36 respectively to drive the bevel gear 62 in the same direction as the direction of rotation of spindle 36 all as indicated by arrows in Fig. 2.

Each end of the idler shaft 56 carries a pair of cogged clutch members 88 and 90, members 88 being attached to the shaft 56 and the members 90 being freely slidable on shaft 56 when out of engagement with the respective members 88. Each of the members 90 are formed to present a pulley as shown in Fig. 3 for receiving a belt 92 which belt 92 passes over an idler pulley 94 and around a sheave 96 secured to the wheels 14. In other words there is a sheave 96 for each of the wheels 14 and a belt 92 for each of these sheaves 96.

In operation, starting of the prime mover 44, which is controlled by a cable 98, causes rotation of the shaft 46 and the pulley 48 mounted thereon. This pulley 48 drives belt 50 and pulley 42 which causes rotation of spindle 36 and the cutting blades 38. Rotation of the spindle 36 and the pulley 40 thereof drives belt 86 and consequently the sheave wheel 60 on the shaft 58.

As seen in Fig. 3, the spring 66 yieldably holds the bevel gear 62 out of engagement with the second bevel gear 64 on idler shaft 56. When the operator exerts a pull upon the cable 76 to rotate the cam member 70 upon stub shaft 58, this cam member 70 serves to force bevel gear 62 downwardly against the action of spring 66 and into engagement with bevel gear 64. This action is made possible because of the fact that member 68 is fixed to shaft 58 and through the medium of the inclined cam faces 78 and 80 on members 68 and 70 respectively. It is thus seen that bevel gear 62 drives bevel gear 64 and shaft 56 which in turn causes rotation of the wheels 14 through the medium of sheaves 96, belts 92 and pulley members 90.

Springs 100 coiled about the shaft 56 yieldably hold the respective members 90 in meshing engagement with the members 88 and it is readily understood that through use of such clutch mechanism, right and left turns may easily be made when the mower is placed in use.

While only one modification of my power lawn mower has been illustrated and described, it is understood that many changes and modifications may be made in mowers having a common prime mover for actuating the cutting mechanism and motivating the mower over the lawn to be cut without departing from the spirit of this invention or scope of the appended claims.

Having thus described the invention, what is new and desired to be secured by Letters Patent is:

1. A lawn mower of the character described comprising a platform; at least one pair of wheels supporting the platform; cutter mechanism having an upright spindle rotatably carried by the platform; a rotatable horizontal idler shaft; structure interconnecting the spindle and the shaft for driving the latter as the spindle is rotated; means operable upon rotation of said shaft for driving said wheels, said structure including a pair of bevel gears having connection with the shaft and the spindle respectively; means for yieldably holding said gears spaced apart; manually manipulable means for shifting one of said gears into engagement with the other gear; and a vertical stub shaft rotatably mounting said one gear, said shifting means and said yieldable means being operable to reciprocate said one gear longitudinally on the stub shaft.

2. A lawn mower of the character described comprising a platform; at least one pair of wheels supporting the platform; cutter mechanism having an upright spindle rotatably carried by the platform; a rotatable horizontal idler shaft; structure interconnecting the spindle and the shaft for driving the latter as the spindle is rotated; means operable upon rotation of said shaft for driving said wheels, said structure including a pair of bevel gears having connection with the shaft and the spindle respectively; means for yieldably holding said gears spaced apart; manually manipulable means for shifting one of said gears into engagement with the other gear; and a vertical stub shaft rotatably mounting said one gear, said shifting means and said yieldable means being operable to reciprocate said one gear longitudinally on the stub shaft, said shiftable means including a pair of complementary cam members on the stub shaft, one of said members being fixed to the stub shaft, the other cam member being interposed between the one cam member and the said one gear and operable to shift the one gear toward the other gear upon rotation of the other cam member.

PAUL W. HAINKE.

REFERENCES CITED

The following references are of record in the file of this patent:

UNITED STATES PATENTS

| Number | Name | Date |
| --- | --- | --- |
| 2,236,433 | Klein | Mar. 25, 1941 |
| 2,270,646 | Campbell | Jan. 20, 1942 |
| 2,288,498 | Underwood | June 30, 1942 |